(12) United States Patent
Hofmann et al.

(10) Patent No.: US 8,317,643 B2
(45) Date of Patent: Nov. 27, 2012

(54) HYDRAULIC TENSIONING SYSTEM COMPRISING INTEGRATED OVERPRESSURE VALVE

(75) Inventors: Dominik Hofmann, Ebern (DE); Roman Kern, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 133 days.

(21) Appl. No.: 12/669,677

(22) PCT Filed: Jun. 13, 2008

(86) PCT No.: PCT/EP2008/057497
§ 371 (c)(1),
(2), (4) Date: Sep. 7, 2010

(87) PCT Pub. No.: WO2009/010352
PCT Pub. Date: Jan. 22, 2009

(65) Prior Publication Data
US 2011/0015013 A1    Jan. 20, 2011

(30) Foreign Application Priority Data
Jul. 17, 2007   (DE) .................. 10 2007 033 600

(51) Int. Cl.
*F16H 7/08*     (2006.01)
*F16H 7/22*     (2006.01)
*F16H 7/18*     (2006.01)

(52) U.S. Cl. ........ 474/110; 474/101; 474/109; 474/111; 474/140

(58) Field of Classification Search .............. 474/109, 474/110, 111, 101, 140
See application file for complete search history.

(56) References Cited

U.S. PATENT DOCUMENTS

| | | | |
|---|---|---|---|
| 4,940,447 A | 7/1990 | Kawashima et al. | |
| 5,033,507 A * | 7/1991 | Pouchot | 137/550 |
| 5,586,952 A | 12/1996 | Izutsu et al. | |
| 5,700,213 A * | 12/1997 | Simpson et al. | 474/110 |
| 5,755,252 A * | 5/1998 | Bergsma et al. | 137/202 |
| 5,819,794 A * | 10/1998 | Anderson | 137/543.17 |
| 6,193,623 B1 * | 2/2001 | Koch et al. | 474/110 |
| 6,322,468 B1 * | 11/2001 | Wing et al. | 474/110 |
| 6,361,458 B1 * | 3/2002 | Smith | 474/109 |
| 6,435,993 B1 * | 8/2002 | Tada | 474/110 |
| 6,592,479 B2 * | 7/2003 | Nakakubo et al. | 474/109 |
| 6,810,907 B2 * | 11/2004 | Hashimoto et al. | 137/514.5 |

FOREIGN PATENT DOCUMENTS

DE    4015708    7/1991

(Continued)

*Primary Examiner* — Michael Mansen
*Assistant Examiner* — Minh Truong
(74) *Attorney, Agent, or Firm* — Volpe and Koenig, P.C.

(57) ABSTRACT

A hydraulic tensioning system (1), which is used in traction mechanism drives, particularly chain drives of internal combustion engines, is provided. The tensioning system (1) includes a piston (3), which is designed in the shape of a crucible, subjected to a pressure by a pressure spring (8), guided in a linearly displaceable manner in a housing (2) and spring-loaded against a traction mechanism. Hydraulic fluid can flow out of a pressure chamber (5) depending on an actuating direction of the piston (3) via an overpressure valve (11) forming a damper and associated with the piston (3) or can enter via a one-way valve (7) of the housing (2) into the pressure chamber (5). The overpressure valve (11) encloses a valve plate (15) that is integrated in the piston (3), and a pressure spring (8) of the piston (3) surrounds an outside of the valve housing (12) of the overpressure valve (11).

9 Claims, 1 Drawing Sheet

FOREIGN PATENT DOCUMENTS

| | | |
|---|---|---|
| DE | 19632383 | 2/1997 |
| DE | 60027227 | 8/2006 |
| EP | 1101975 | 5/2001 |
| WO | 2005108823 | 11/2005 |

* cited by examiner

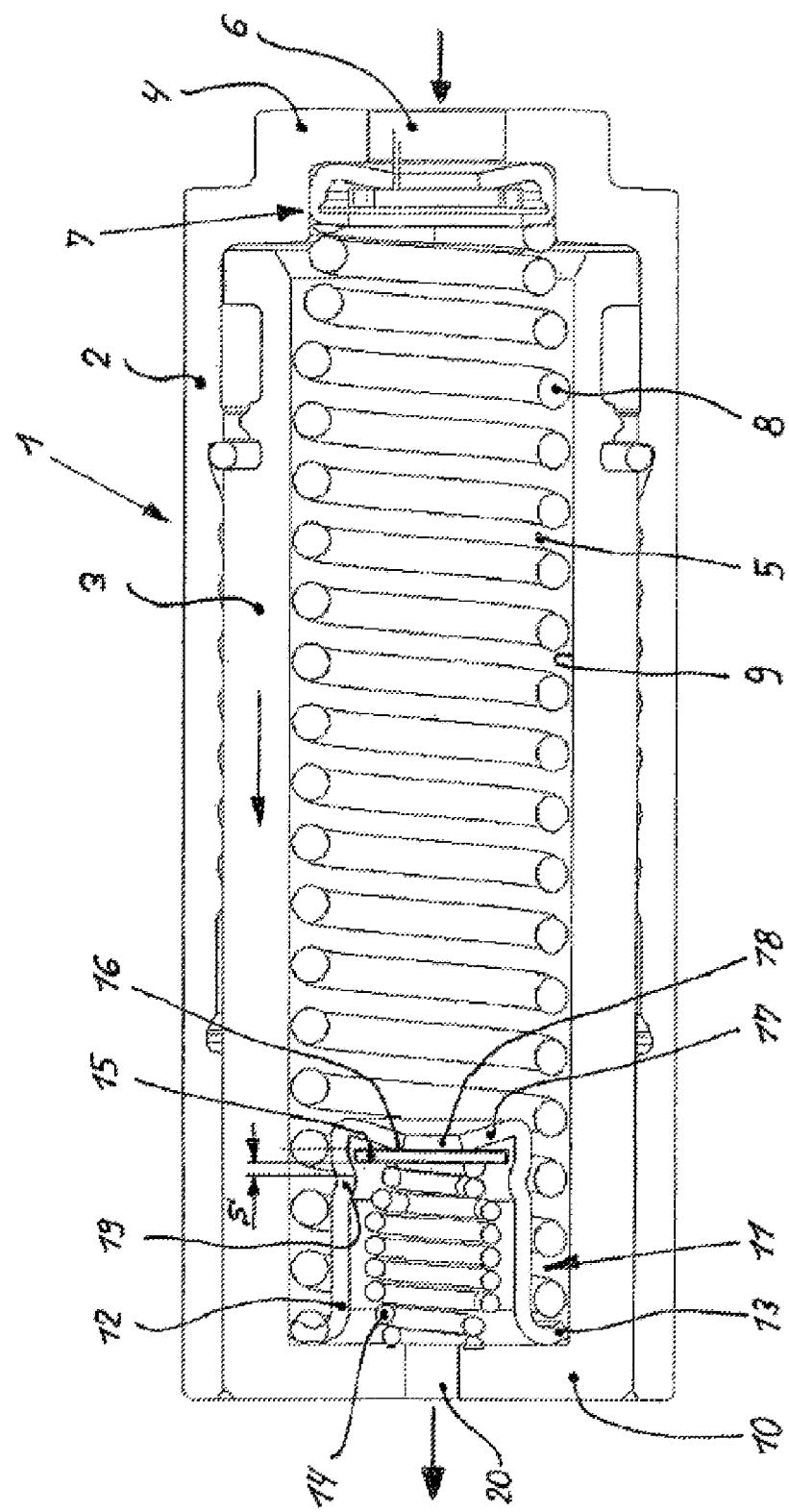

HYDRAULIC TENSIONING SYSTEM COMPRISING INTEGRATED OVERPRESSURE VALVE

BACKGROUND

The present invention relates to a hydraulic tensioning system that is used in traction mechanism drives, in particular, chain drives of internal combustion engines. The tensioning system comprises a crucible-shaped piston that is guided in a linearly displaceable manner in a housing provided as the cylinder and that is spring-loaded directly or indirectly against a traction mechanism. As a function of an actuating-movement direction of the piston, the hydraulic fluid of the tensioning system is discharged from the pressure chamber via a damping device or flows into the pressure chamber via a one-way valve.

Hydraulic tensioning systems in the construction described previously are preferably used in chain drives of internal combustion engines, wherein, for pressurizing the tensioning system with hydraulic fluid, the housing is connected via an opening to the pressure circulating lubrication system of the internal combustion engine.

The damping device of hydraulic tensioning systems must be adapted exactly to the conditions of use, because the flow cross section or the flow rate of the hydraulic fluid via the damping device directly influences the damping of the piston.

As an example, from DE 40 15 708 C1, a hydraulic tensioning system is known. The hollow-cylindrical piston closed on one side by a piston floor has, in its hollow space, a ring-shaped disk that contacts the piston floor with a planar end face. The ring-shaped disk is provided with a passage borehole that communicates with throttling channels. The pressure chamber extends into the interior of the hollow-shaped piston. In the case of inward movement of the piston into the housing, the pressurized hydraulic fluid flows through the passage borehole of the ring-shaped disk and the throttling channels via an opening in the piston floor, for example, into a collection chamber allocated to the tensioning system.

SUMMARY

The invention is based on the objective of providing an installation-space-optimized, economical hydraulic tensioning system.

This previously stated objective is met according to the present invention by an overpressure valve that acts as a damper positioned within the piston and is constructed as a spring-loaded valve plate. The design of the overpressure valve according to the invention is realized so that its crucible-shaped valve housing is surrounded by a compression spring allocated to the piston. In connection with an installation position integrated completely in the piston, the overpressure valve constructed according to the invention as a valve plate realizes an installation-space-optimized solution to meet the objective. Compared with previous tensioning systems in which the overpressure valve is positioned before the piston compression spring, the concept according to the invention takes further advantage of the necessary installation space in the axial direction, by which the entire hydraulic tensioning system advantageously has a smaller longitudinal extent.

Advantageous constructions of the invention are provided below and in the claims.

The configuration of the overpressure valve according to the invention advantageously comprises a valve housing that has an opening in a floor directed toward the compression spring of the piston, wherein this opening forms a valve seat on the inside of the valve housing. In the closed state of the overpressure valve, a spring-loaded valve plate forms a sealing contact on the valve seat.

Furthermore, the valve housing preferably has a partial or circular rim directed radially outward. In the installation-space situation of the overpressure valve, one spring end of the compression spring integrated within the piston is supported by the rim of the valve housing with a non-positive fit on the piston floor. Supporting the effect of the overpressure valve, the rim of the valve housing is supported with a pressure-tight and liquid-tight contact on the piston floor. This goal can be achieved through corresponding production tolerances, by which a high-quality seal can be achieved in the contact zone between the rim and the piston floor without expanding sealing means. As an alternative or in support of the production-specific sealing quality, it is possible to use suitable sealing means. As a measure leading to simplification of the mounting, it is also provided according to the invention to use the valve housing by an interference fit in the piston interior space. Here it is preferred to form local regions of the rim so that these are positioned with a certain biasing on the inner wall of the piston in the installed state of the overpressure valve.

For creating a stroke limit for the valve plate of the overpressure valve constructed as a valve plate it is preferably provided to arrange at least a partial bead directed radially inward in the valve housing. The bead is here offset so far from the valve seat of the overpressure valve that a sufficient opening cross section is set that guarantees a largely unhindered flow of the hydraulic fluid. In addition to a stroke limit, the bead further creates a captive arrangement of the valve plate, which has an advantageous effect on the mounting. The bead of the valve housing can also be used for supporting a plate spring that is provided for spring-loading the valve plate on the valve seat. This configuration allows the disclosure of an overpressure valve containing all of the components, by which simplification of the mounting is simultaneously realized. The plate spring can be used as an alternative to a helical compression spring supported between the piston floor and the valve plate.

Another preferred construction of the invention allows the arrangement of the valve seat for the valve plate in a conically inward directed section of the floor of the valve housing. This construction advantageously creates a defined linear contact between the valve plate and the zone forming the valve seat in the floor of the valve housing. Thus, advantageously an improved sealing effect of the overpressure valve could be established.

For producing the valve housing, a non-cutting deep-drawing method is preferred. In this way, a valve housing could also be produced economically in large quantities from sheet metal through forming.

The hydraulic tensioning system in which the overpressure valve is integrated advantageously includes another plate valve by which the hydraulic fluid flows into the pressure chamber. Comparable to the overpressure valve, this valve also comprises a spring-loaded valve plate that interacts with a flow opening in the housing.

BRIEF DESCRIPTION OF THE DRAWING

The invention will be explained in more detail below with reference to the FIGURE, which is a longitudinal section view of a hydraulic tensioning system.

DETAILED DESCRIPTION OF THE PREFERRED EMBODIMENT

The sole FIGURE shows a hydraulic tensioning system 1 according to the invention in a longitudinal section. The configuration comprises a crucible-shaped housing 2 that is provided for accommodating a piston 3 whose opened side is allocated to a floor 4 of the housing 2. The housing 2 and also the piston 3 define a pressure chamber 5 that is filled, in the operating state, with a hydraulic fluid. For linear displacement of the piston 3 in the arrow direction, the hydraulic fluid flows via an inlet opening 6 formed in the floor 4 of the housing 2 and also a downstream one-way valve 7 into the pressure chamber 5. A compression spring 8 supporting the actuating movement of the piston 5 is supported with a first spring end directly on the one-way valve 7 that is constructed as a plate valve and that is arranged in a stepped section of the floor 4. The additional spring end of the compression spring 8 extends across the entire length of the piston 3 and is guided on an inner wall of the piston 3 and connects to a piston floor 10. In the installed state, the crucible-shaped piston 3 is allocated to a not-shown traction mechanism by the piston floor 10 directly or indirectly, in particular, by a tensioning rail.

In the operating state, oscillations in the traction mechanism or fluctuations in the torque can cause temporary counter forces that create a cushioning of the piston 3 in the housing 2. Due to the incompressible hydraulic fluid, when an opening pressure of an overpressure valve 11 is reached, a partial quantity of the hydraulic fluid is cut off. For achieving an installation-space-optimized position, the overpressure valve 11 which acts as a damper is integrated in the piston 3. The overpressure valve 11 comprises a valve housing 12 that is open on one side and that is produced without cutting, in particular, through a deep-drawing method. The valve housing 12 surrounded on the outside by the compression spring 8 is supported with a partial or circular rim 13 directed radially outward by a contact face 23 on the piston floor 10. Here, a stable installed position of the valve housing 12 is set by the compression spring 8 in which one spring end is supported directly on the rim 13. For simplification of the mounting, it is possible to construct the rim 13 so that it is guided on the inner wall 9 of the piston 3 with a certain biasing with a non-positive fit. In this way, a captive arrangement is simultaneously set, because the overpressure valve 11 is also positioned completely in the piston 3 without a compression spring 8.

In the valve housing 12 of the overpressure valve 11, a compression spring 14 is integrated that is used between the piston floor 10 and a valve plate 15 of the overpressure valve 11. On the side facing away from the compression spring 14, the valve plate 15 is in active connection with a valve seat 16 on the floor 17 of the valve housing 12. As a measure for improving the sealing quality of the valve plate 15, the floor 17 has a conical construction in the direction of the compression spring 14, by which a nearly linear contact of the valve plate 15 is set on the valve seat 16, which improves the sealing quality. Axially offset to the valve seat 16 and characterized by the distance measure "s", a circular or partial bead 19 directed radially inward is introduced into the valve housing 12, wherein this bead forms, on one hand, a stroke limit and, on the other hand, a captive arrangement for the valve plate 15. For this purpose, the diameter of the valve plate 15 exceeds an inner diameter of the valve housing 12 in the region of the bead 19. In the case of an overpressure in the pressure chamber 5 in which the valve plate 15 lifts from the valve seat 16, a partial quantity of the hydraulic fluid from the pressure chamber 5 can be shut off by the overpressure valve 11 that acts as a damper and also a borehole 20 introduced centrally in the piston floor 10.

LIST OF REFERENCE SYMBOLS

1 Tensioning system
2 Housing
3 Piston
4 Floor
5 Pressure chamber
6 Inlet opening
7 One-way valve
8 Compression spring
9 Inner wall
10 Piston floor
11 Overpressure valve
12 Valve housing
13 Rim
14 Compression spring
15 Valve plate
16 Valve seat
17 Floor
18 Opening
19 Bead
20 Borehole
23 Contact face

The invention claimed is:

1. Hydraulic tensioning system that is used in traction mechanism drives of internal combustion engines, the tensioning system comprises a crucible-shaped piston that is guided linearly displaceable in a housing constructed as a cylinder and is spring-loaded against a traction mechanism, wherein a pressure chamber is located between the piston and the cylinder and, as a function of an actuating movement direction of the piston, a hydraulic fluid can flow out of the pressure chamber via an overpressure valve or can flow into the pressure chamber via a one-way valve, and the overpressure valve is integrated within the piston and acts as a damper and includes a valve plate within a deep-drawn valve housing that has a radially inward directed bead as a stroke limit for the valve plate, wherein the valve housing of the overpressure valve is surrounded by a compression spring of the piston that extends to a piston floor, the valve housing of the overpressure valve has a floor, and an opening in the floor forms a valve seat on an inside of the valve housing, and the bead is spaced from the floor of the valve housing.

2. Hydraulic tensioning system according to claim 1, wherein in a closed state of the overpressure valve, a valve plate pressurized by a compression spring forms a sealing contact on the valve seat.

3. Hydraulic tensioning system according to claim 1, wherein the compression spring of the piston is supported on a radially outward directed rim of the valve housing, by which the overpressure valve is supported on the piston floor with a non-positive fit in an installed state.

4. Hydraulic tensioning system according to claim 3, wherein the valve housing is supported with a sealing contact by a contact face set between the rim and the piston floor.

5. Hydraulic tensioning system according to claim 1, wherein a rim of the valve housing is positioned by an interference fit on an inner wall of the piston.

6. Hydraulic tensioning system according to claim 5, wherein the valve housing is supported with a sealing contact by a contact face set between the rim and the piston floor.

7. Hydraulic tensioning system according to claim 1, wherein a spring is located on the bead that is constructed as a plate spring and that mutually interacts with the valve plate.

8. Hydraulic tensioning system according to claim 1, wherein the floor of the valve housing has a section directed conically inward in a direction of a compression spring for the valve plate and forms the valve seat.

9. Hydraulic tensioning system according to claim 1, wherein the hydraulic fluid flows into the pressure chamber via a one-way valve that is constructed as a plate valve and that includes a valve plate and that is integrated in the housing.

* * * * *